United States Patent
Army et al.

(10) Patent No.: US 11,905,041 B2
(45) Date of Patent: Feb. 20, 2024

(54) METHOD OF MANAGING ENGINE COOLER MAINTENANCE SCHEDULE

(71) Applicant: Hamilton Sundstrand Corporation, Charlotte, NC (US)

(72) Inventors: Donald E. Army, Enfield, CT (US); John W. Kowalski, Hadley, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 524 days.

(21) Appl. No.: 17/243,256

(22) Filed: Apr. 28, 2021

(65) Prior Publication Data
US 2021/0339889 A1   Nov. 4, 2021

Related U.S. Application Data

(60) Provisional application No. 63/018,886, filed on May 1, 2020.

(51) Int. Cl.
*B64D 33/08* (2006.01)
*B64F 5/60* (2017.01)
*G06Q 10/20* (2023.01)

(52) U.S. Cl.
CPC .............. *B64F 5/60* (2017.01); *G06Q 10/20* (2013.01)

(58) Field of Classification Search
CPC ............ B64D 33/08; B64D 2045/0085; G06Q 50/30; G06Q 10/20; B33Y 80/00; F28F 19/00; F28F 27/00; F28F 9/0275; F28F 2280/10; F28F 2210/02; F02C 7/12; F28D 11/00; F28D 7/16; F28D 2021/0021; B64F 5/60; F05D 2260/80; Y02T 50/60
See application file for complete search history.

(56) References Cited

U.S. PATENT DOCUMENTS

| | | | |
|---|---|---|---|
| 9,157,685 B2 | 10/2015 | Dixon et al. | |
| 9,666,958 B2* | 5/2017 | Harwath | H04B 5/0012 |
| 10,139,795 B2 | 11/2018 | Nicks | |
| 10,345,830 B2 | 7/2019 | Crowley et al. | |
| 10,900,981 B1* | 1/2021 | Bertrand | G01N 35/00732 |

(Continued)

FOREIGN PATENT DOCUMENTS

| | | |
|---|---|---|
| EP | 1464575 A1 | 10/2004 |
| EP | 2051036 A1 | 4/2009 |

OTHER PUBLICATIONS

Azzam et al., FUMS/spl trade/ technologies for verifiable affordable prognostics health management (PHM), 2004, IEEE, p. 3764-3781 (Year: 2004).*

(Continued)

*Primary Examiner* — Mcdieunel Marc
(74) *Attorney, Agent, or Firm* — Kinney & Lange, P.A.

(57) ABSTRACT

A method of tracking an engine cooler in an aircraft includes recording an orientation of the engine cooler as orientation N. Prognostic health management data of the aircraft is tracked. A maintenance check of the aircraft is performed based on the tracked prognostic health management data. Whether to rotate an orientation of the engine cooler is determined with an aircraft maintenance database based on the tracked prognostic health management data of the aircraft. A recommendation is provided by the aircraft maintenance database as to whether to rotate the engine cooler. The orientation of the engine cooler is recorded as orientation N+1.

16 Claims, 5 Drawing Sheets

(56) References Cited

U.S. PATENT DOCUMENTS

| | | |
|---|---|---|
| 11,359,339 B2* | 6/2022 | Pirazzini ............. E01C 19/1009 |
| 2016/0164197 A1* | 6/2016 | Harwath ............. H04B 5/0012 |
| | | 439/578 |
| 2017/0191762 A1 | 7/2017 | Duesler et al. |
| 2018/0045117 A1* | 2/2018 | Groves, II ............... F02C 3/10 |
| 2019/0101342 A1 | 4/2019 | Victor et al. |
| 2019/0285364 A1 | 9/2019 | Streeter et al. |

OTHER PUBLICATIONS

Hardman et al., SH-60 helicopter integrated diagnostic system (HIDS) program-diagnostic and prognostic development experience, 1999, IEEE, p. 473-491 (Year: 1999).*

Hardman et al., A Usn development strategy and demonstration results for propulsion and mechanical systems diagnostics, prognostics and health management, 2001, IEEE, p. 1-10 (Year: 2001).*

Alcock et al., The development of an advanced diagnostic/prognostic system for the RB199 aero engine, 2005, IEEE, p. 1-9 (Year: 2005).*

Communication pursuant to Article 94(3) EPC for European Patent Application No. 21171703.8, dated Jul. 11, 2022, 4 pages.

Extended European Search Report dated Sep. 7, 2021, received for corresponding European Application No. 21171703.8, eight pages.

* cited by examiner

METHOD OF MANAGING ENGINE COOLER MAINTENANCE SCHEDULE

CROSS-REFERENCE TO RELATED APPLICATION(S)

This application claims priority to provisional application No. 63/018,886 filed on May 1, 2020.

BACKGROUND

In general, the present disclosure relates to engine coolers. In particular, the present disclosure relates to managing an engine cooler maintenance schedule.

In high temperature engine coolers, localized differences in temperature gradients on engine cooler parts result in uneven distribution of thermal stresses and loads on those parts, over extended operation. The uneven distribution of thermal stresses and loads can cause localized thermal fatigue cracks from the engine coolers being subjected to repeated high thermal gradients. Such fatigue cracks often limit the useful service life of the engine coolers.

SUMMARY

A method of tracking an engine cooler in an aircraft includes recording an orientation of the engine cooler as orientation N. Prognostic health management data of the aircraft is tracked. A maintenance check of the aircraft is performed based on the tracked prognostic health management data. Whether to rotate an orientation of the engine cooler is determined with an aircraft maintenance database based on the tracked prognostic health management data of the aircraft. A recommendation is provided by the aircraft maintenance database as to whether to rotate the engine cooler. The orientation of the engine cooler is recorded as orientation N+1.

A method of managing an orientation of an engine cooler includes marking the engine cooler. The marking on the engine cooler is scanned with a scanner. A first orientation N of the engine cooler is detected based on the scanned marking. The detected orientation of the engine cooler is reported to the aircraft maintenance database. Maintenance records, of the aircraft maintenance database, are updated with the reported detected orientation of the engine cooler. A recommendation of installation position is provided based on the detected orientation of the engine cooler and on prognostic health management data of the aircraft. The engine cooler is installed onto the aircraft based on the recommended installation position from the aircraft maintenance database.

A method of managing maintenance of an environmental control system of an aircraft includes installing a first heat exchanger as part of the environmental control system. An orientation N identifying a position of the first heat exchanger is recorded in an aircraft maintenance database. A cycle count of the aircraft is tracked with a cycle counter. A maintenance check of the aircraft is performed when the tracked cycle count reaches a threshold value. The first heat exchanger is removed from the aircraft. Whether to rotate an orientation of the heat exchanger is determined based on the tracked cycle count of the aircraft. An orientation of the heat exchanger is reversed. The aircraft maintenance database is updated to indicate the reversed orientation of the first heat exchanger as orientation N+1. The first heat exchanger is replaced into the aircraft.

The present summary is provided only by way of example, and not limitation. Other aspects of the present disclosure will be appreciated in view of the entirety of the present disclosure, including the entire text, claims, and accompanying figures.

Figure 1:
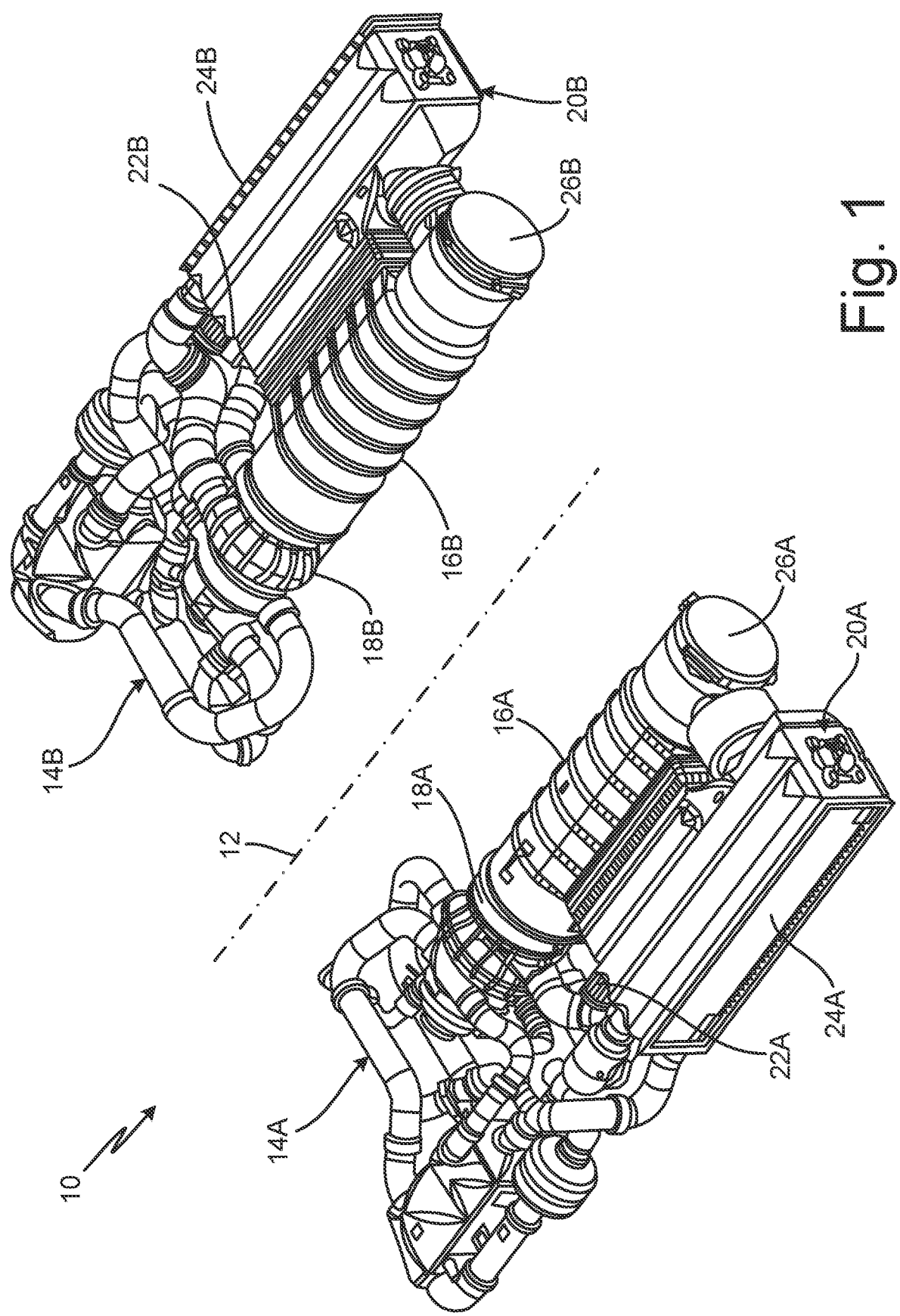
FIG. 1 is a perspective view of a section of an environmental control system with a dual heat exchanger assembly.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

Localized differences in temperature gradients on engine cooler parts can result in uneven distribution of thermal stresses and loads on those parts, over extended operation. To ameliorate those stresses, prognostic health management ("PHM") integrating data from 2D matrix or radio-frequency identification ("RFID") tags, human-readable placards, and aircraft maintenance databases ("AMDs") for a given engine cooler is used to facilitate tracking of the engine cooler's orientation and expected accumulated thermal stresses. Due to a symmetric design of the engine cooler, an orientation of the engine cooler can be adjusted (e.g. rotated and/or reversed) at suitable maintenance intervals based on this data to minimize local thermal fatigue and extend the serve life of the engine cooler.

FIG. 1 is a perspective view of environmental control system assembly 10 ("ECS assembly 10") and shows centerline axis 12 and first ECS pack 14A with first fan inlet diffuser housing 16A ("FIDH 16A"), first air cycle machine 18A ("ACM 18A"), first heat exchanger 20A, first bleed inlet port 22A, first RAM inlet port 24A, and first RAM outlet port 26A. FIG. 1 also shows second ECS pack 14B with second FIDH 16B, second ACM 18B second heat exchanger 20B, second bleed inlet port 22B, second RAM inlet port 24B, and second RAM outlet port 26B.

Figure 2:
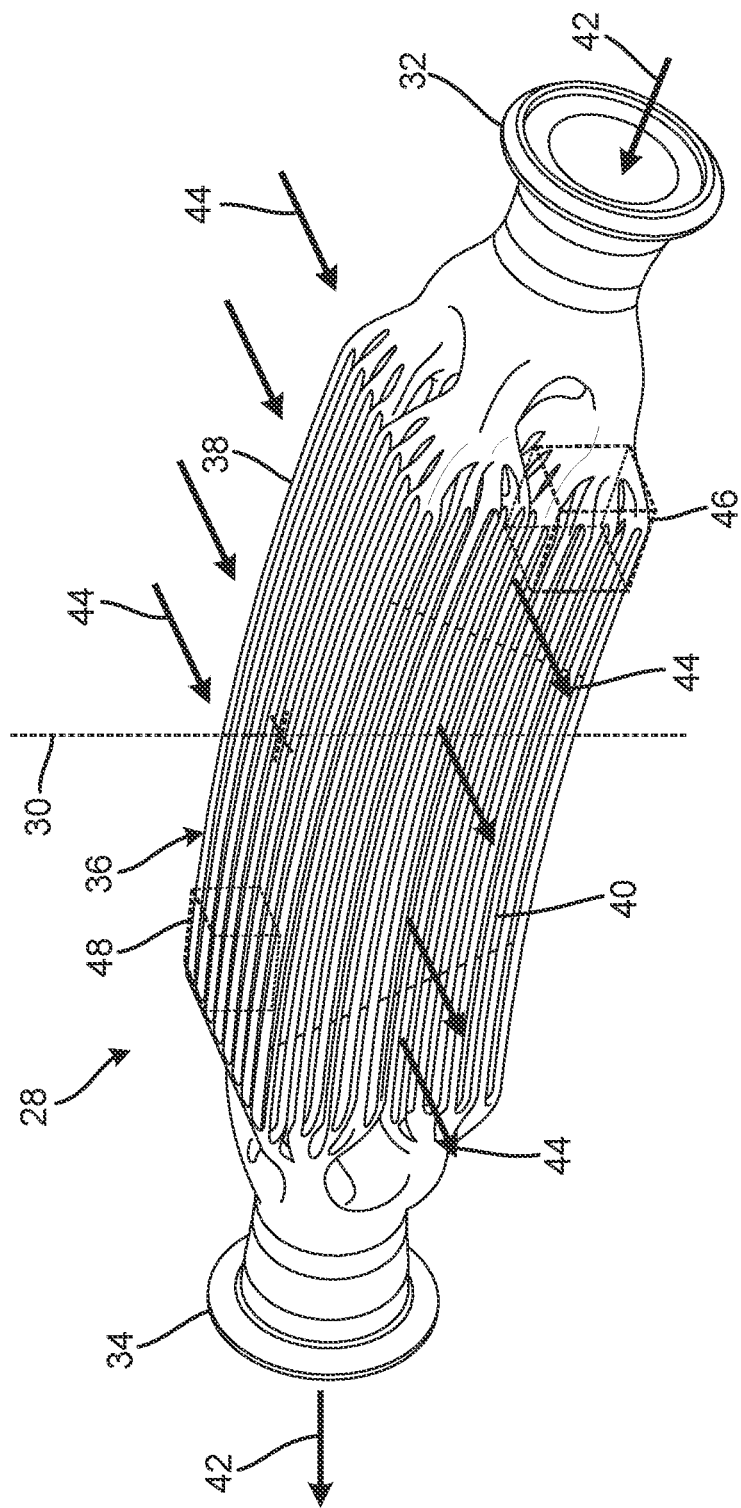
FIG. 2 is a perspective view of an engine cooler.

As discussed herein, the structure and operation of second ECS pack 14B generally parallels that of first ECS pack 14A, discussed above. For example, regarding second ECS pack 14B and its components, second ECS pack 14B operates in the same or substantially the same manner as that of first ECS pack 14A and its components. Accordingly, the following description of first ECS pack 14A and its components also extends to second ECS pack 14B and its corollary components (e.g., first FIDH 16A to second FIDH 14B, etc.). As such, because the description of first ECS pack 14A and its components can be used to describe second ECS pack 14B and its components, a full description of second ECS pack 14B is herein omitted in the interest of avoiding undue repetition. The same or similar comparison also extends to the descriptions of FIGS. 2-3 provided herein.

ECS assembly 10 is an assembly of first and second ECS packs 14A and 14B. Centerline axis 12 is a major axis of the aircraft and is disposed at a midpoint between first and second ECS packs 14A and 14B. First ECS pack 14A is an environmental control system. In this non-limiting embodiment, first ECS pack 14A is an environmental control system for an aircraft. First FIDH 16A is a fan inlet diffuser housing. First ACM 18A is an air cycle machine. First heat exchanger 20A is a heat exchanger with a plurality of fins for transferring thermal energy between the fins and a fluid (e.g., air). First bleed inlet port 22A is an inlet port for bleed air. First RAM inlet port 24A is an inlet port for ram air. First RAM outlet port 26A is an outlet port for RAM air.

ECS assembly 10 is mounted within a portion of an aircraft. First ECS pack 14A is fluidly connected to numerous fluid sources such as an engine, an auxiliary power unit, a source of ambient air, a cabin, a cockpit, and/or a source of ram air of the aircraft. First FIDH 16A is mounted to a side of first heat exchanger 20A and to first ACM 18A. In other illustrative embodiments, first FIDH 16A can be replaced with another component or removed all together from first ECS pack 14A. First ACM 18A is fluidly connected to first FIDH 16A. First heat exchanger 20A is mounted to and fluidly connected with first FIDH 16A. First bleed inlet port 22A is mounted and fluidly connected to an end of first heat exchanger 20A. First RAM inlet port 24A is mounted to and fluidly connected with a side-face of first heat exchanger 20A. First RAM outlet port 26A is mounted and fluidly connected to an end of FIDH 16A.

ECS assembly 10 with first ECS pack 14A and second ECS pack 14B controls and manages the transfer of thermal energy and pressures among the different sources of air throughout the aircraft. First FIDH 16A receives and transfers air away from first heat exchanger 20A. First ACM 18A assists with changes to the pressure, temperature, and/or humidity of air passing through first ACM 18A. First heat exchanger 20A conditions a flow of air passing through first heat exchanger 20A. First bleed inlet port 22A guides and transfers a flow of bleed air into first heat exchanger 20A. First RAM inlet port 24A receives a flow of ram air from ambient and transfers that air to first heat exchanger 20A. First RAM outlet port 26A transfers a flow of air out of FIDH 16A.

Here, first heat exchanger 20A and second heat exchanger 20B are symmetric about centerline axis 12 such that both first heat exchanger 20A and second heat exchanger 20B can be rotated about centerline axis 12 and installed in the other's initial position. For example, first heat exchanger 20A can be removed from first ECS pack 14A, rotated 180° about centerline axis 12, and reinstalled into second ECS pack 14B. Likewise, second heat exchanger 20B can be removed from second ECS pack 14B, rotated 180° about centerline axis 12, and reinstalled into first ECS pack 14A. The subsequent descriptions and methodology discussed with respect to FIGS. 2-5 can also be applied to ECS assembly 10 in order to determine when first heat exchanger 20A and/or second heat exchanger 20B need to or should be flipped/rotated and installed in a new position.

FIG. 2 is a perspective view of engine cooler 28 and shows rotational axis 30, inlet port 32, outlet port 34, pipes 36, first cold inlet face 38, second cold outlet face 40, hot flow 42, cold flow 44, first region 46, and second region 48.

Throughout this disclosure, the terms, elements, and/or components of "engine cooler" and "heat exchanger" can be used interchangeably.

Engine cooler 28 is an additively manufactured fractal heat exchanger core. In this example, engine cooler 28 is symmetric about a vertical plane (with vertical being in an upward direction in FIG. 2) through a midpoint of engine cooler 28. Also, in this example engine cooler 28 includes a slight arc or curve from inlet port 32 to outlet port 34. In other embodiments, engine cooler 28 can include a non-arcuate shape such as a cuboid. In this example, engine cooler 28 include a symmetric design such that the hot and cold circuits are reversible.

Rotational axis 30 is an axis of rotation of engine cooler 28. Inlet port 32 and outlet port 34 are fluidic ports for transferring a fluid (e.g., air). Pipes 36 are elongate tubes with fluidic passages extending therethrough. First cold inlet face 38 and second cold outlet face 40 are opposing side-faces of engine cooler 28. Hot flow 42 is a flow of hot air such as bleed air from the aircraft engine. Cold flow 44 is a flow of cold air such as from RAM air. First region 46 and second region 48 are corners of engine cooler 28. In another example, first region 46 and second region 48 can each extend a length of an edge of engine cooler 28.

Rotational axis 30 passes through a mid-point of engine cooler 28. In this example, rotational axis 30 passes vertically through engine cooler 28 due to engine cooler 28 being symmetric about a vertical plane. In an example where engine cooler 28 includes a cuboid configuration, rotational axis 30 or another rotational axis can also pass through the midpoint of engine cooler 28 and perpendicular to the up-down orientation of rotational axis 30 shown here in FIG. 2.

Inlet port 32 is disposed on a first end of engine cooler 28 and is fluidly connected to pipes 36. Outlet port 34 is disposed on an opposite end of engine cooler 28 from inlet port 32 and is fluidly connected to pipes 36. Pipes 36 extend between and are fluidly connected to inlet port 32 and outlet port 34. First face 38 is disposed on a first side of engine cooler 28. Second face 40 is disposed on an opposite side of engine cooler 28 from first face 38. Hot flow 42 passes through and inside of inlet port 32, outlet port 34, and pipes 36. Cold flow 44 enters into engine cooler 28 across first face 38, passes through gaps and spaces between individual pipes 36, and exits out of engine cooler 28 through second face 40. First region 46 is disposed on an end of pipes 36 adjacent to and immediately downstream from inlet port 32. Second region 48 is disposed on an end of pipes 36 opposite from first region 46 and is adjacent to and immediately upstream from outlet port 34.

Engine cooler 28 transfers thermal energy between hot flow 42 and cold flow 44. Rotational axis 30 serves as an axis about which engine cooler 28 can be rotated about in order to reverse the relative directions of hot flow 44 and cold flow 46 through engine cooler 28. In this example, inlet port 32 receives hot flow 42 and transfers hot flow 42 into pipes 36. Whereas, in another example with engine cooler 28 being rotated 180° about rotational axis 30, inlet port 32 would become an outlet port as hot flow 42 would be passing from pipes 36 to inlet port 32 and out of engine cooler 28.

In this example, outlet port 34 receives hot flow 42 from pipes 36 and transfers hot flow 42 out of engine cooler 28. In this example, pipes 36 transport hot flow 42 from inlet port 32 to outlet port 34. Also, due to pipes 36 being spaced from each other, the spaces between individual pipes 36 provide an area through which cold flow 44 flows. As cold flow 44 flows across exterior surfaces of pipes 36, thermal energy is transferred from hot flow 42 passing through pipes 36, across the physical material of pipes 36, and into cold flow 44 passing across the surfaces of pipes 36. In this way, engine cooler 28 transfers thermal energy from hot flow 42 to cold flow 44. In this example, cold flow 44 enters into engine cooler 28 through first face 38. Likewise, cold flow 44 exits engine cooler 28 through second face 40. Hot flow 42 carries thermal energy into heat exchange core 28. As hot flow 42 passes through pipes 36, thermal energy is transferred from hot flow 42 to cold flow 44 across pipes 36.

In this example, first region 46 represents a corner of engine cooler 28 that gets the hottest due to its positioning relative to hot flow 42 and cold flow 44. For example, as hot flow 42 passes into pipes 36, hot flow 42 contains the highest amount of thermal energy as hot flow 42 first enters into pipes 36. Then, as hot flow 42 passes down pipes 36, hot flow 42 is subjected to transfer of thermal energy as cold flow 44 passes across pipes 36. Also, in this example, second region 48 represents a corner of engine cooler 28 that is the coldest due to its positioning relative to hot flow 42 and cold flow 44. For example, as hot flow 42 passes into pipes 36, hot flow 42 contains the lowest amount of thermal energy as hot flow 42 is about to exit pipes 36. In addition, the location of second region 48 is right at first face 38 where cold flow 44 is entering into engine cooler 28 and where cold flow 44 is at its coldest (e.g., has the lowest amount of thermal energy).

Here, because engine cooler 28 is symmetrical, engine cooler 28 has the capability to rotate about rotational axis 30 thus making the outlet the inlet and the inlet the outlet for both the hot and the cold sides of engine cooler 28. For example, rotating engine cooler 28 about rotational axis 30, will make inlet port 32 into an outlet and outlet port 34 into an inlet as well as causing first face 38 to become an outlet side-face and second face 40 to become an inlet side-face of engine cooler 28. After engine cooler 28 has been rotated 180° about rotational axis 30, engine cooler 28 is then reinstalled back into position.

In rotating engine cooler 28 180° about rotational axis 30, first region 46 that had been subjected to high amounts of thermal energy stress will be on the opposite corner where first region 46 is not going to be stressed further and second region 48 (the other low thermal energy stress corner) will be exposed to some of the thermal fatigue cycles because second region 48 will receive high temperature air from outlet port 34 (which will be an inlet due to the 180° rotation). (See e.g., FIGS. 3A and 3B for further discussion of the rotation/reversal of engine cooler 28).

Figure 3A:
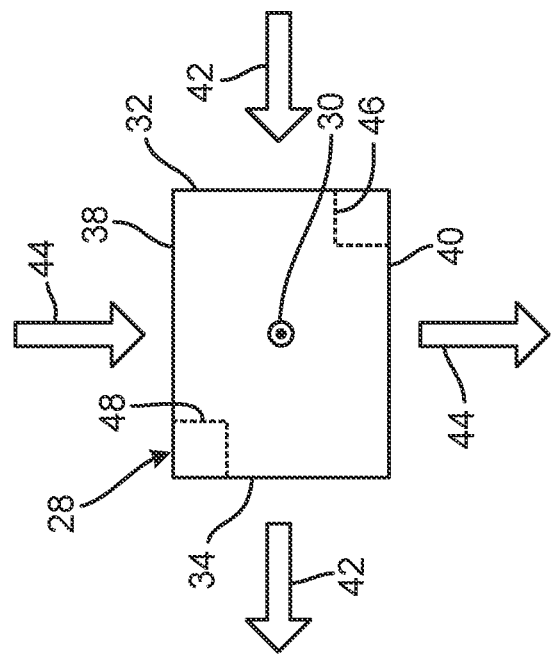
FIG. 3A is a simplified schematic view of the engine cooler in a first installation orientation.
Figure 3B:
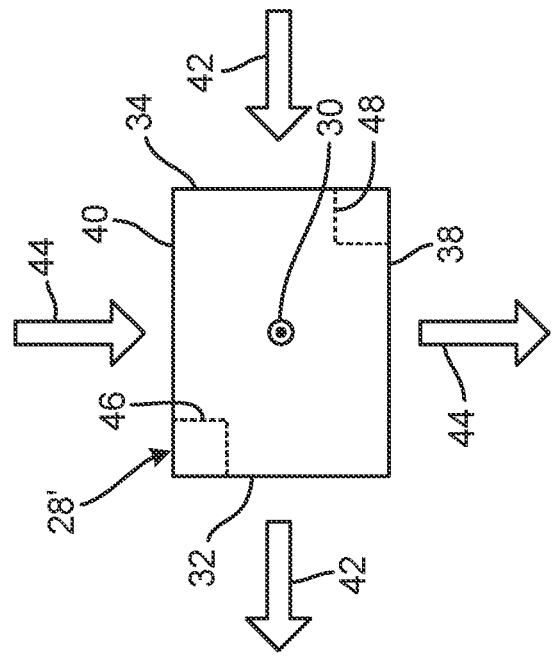
FIG. 3B is a simplified schematic view of the engine cooler in a second installation orientation.

FIG. 3A is a simplified schematic view of engine cooler 28 in a first installation orientation N and shows rotational axis 30, inlet port 32, outlet port 34, first face 38, second face 40, hot flow 42, cold flow 44, first region 46, and second region 48. Pipes 36 are omitted here for clarity. FIG. 3B is a simplified schematic view of engine cooler 28' in a second installation orientation N+1 and shows rotational axis 30, inlet port 32, outlet port 34, first face 38, second face 40, hot flow 42, cold flow 44, first region 46, and second region 48. FIGS. 3A and 3B will be discussed in tandem.

In FIG. 3A, engine cooler 28 is shown as occupying installation orientation N which involves inlet port 32 receiving hot flow 42, outlet port 34 porting out hot flow 42, first face 38 receiving cold flow 44, and second face 40 porting out cold flow 44. In orientation N, first region 46 represents a corner of engine cooler 28 that gets the hottest due to its positioning relative to hot flow 42 and cold flow 44. For example, hot flow 42 contains the highest amount of thermal energy as hot flow 42 first enters into engine cooler 28 through inlet port 32. Then, as hot flow 42 passes down engine cooler 28, hot flow 42 is subjected to transfer of thermal energy as cold flow 44 passes across engine cooler 28. Likewise, second region 48 represents a corner of engine cooler 28 that is the coldest due to its positioning relative to hot flow 42 and cold flow 44. For example, as hot flow 42 passes through engine cooler 28, hot flow 42 contains the lowest amount of thermal energy as hot flow 42 is about to exit engine cooler 28. In addition, the location of second region 48 is right at first face 38 where cold flow 44 is entering into engine cooler 28 and where cold flow 44 is at its coldest (has the lowest amount of thermal energy).

In FIG. 3B, engine cooler 28' is shown as occupying installation orientation N+1. In orientation N+1, engine cooler 28' has been rotated 180° from orientation N about rotational axis 30. Due to this 180° rotation, engine cooler 28' is oriented such that outlet port 34 receives hot flow 42, inlet port 32 ports out hot flow 42, second face 40 receives cold flow 44, and first face 38 ports out cold flow 44. In this orientation N+1, second region 48 represents a corner of engine cooler 28' that gets the hottest due to its positioning relative to hot flow 42 and cold flow 44. For example, hot flow 42 contains the highest amount of thermal energy as hot flow 42 first enters into engine cooler 28' through outlet port 34. Then, as hot flow 42 passes down engine cooler 28', hot flow 42 is subjected to transfer of thermal energy as cold flow 44 passes across engine cooler 28'. Likewise, first region 46 represents a corner of engine cooler 28' that is the coldest due to its positioning relative to hot flow 42 and cold flow 44. For example, as hot flow 42 passes through engine cooler 28', hot flow 42 contains the lowest amount of thermal energy as hot flow 42 is about to exit engine cooler 28' through inlet port 32. In addition, the location of first region 46 is right at second face 40 where cold flow 44 is entering into engine cooler 28' and where cold flow 44 is at its coldest (has the lowest amount of thermal energy).

In rotating engine cooler 28 between orientation N and orientation N+1, the higher amount of thermal fatigue subjected to the corner of engine cooler 28 positioned nearest the inlet of hot flow 42 and nearest the outflow of cold flow 44 (e.g., first region 46 in engine cooler 28 and second region 48 in engine cooler 28') is not always applied to the same spot. A certain amount of thermal fatigue or wear is applied to first region 46 while engine cooler 28 occupies orientation N for so many operation cycles, and then gets rotated into orientation N+1 so that second region 48 can be subjected to higher amounts of thermal fatigue. In this way, the thermal fatigue to due high temperatures gradients can be distributed across both first region 46 and second region 48 resulting in distribution of any correlated damage and an increase in the life expectancy of engine cooler 28.

Figure 4:
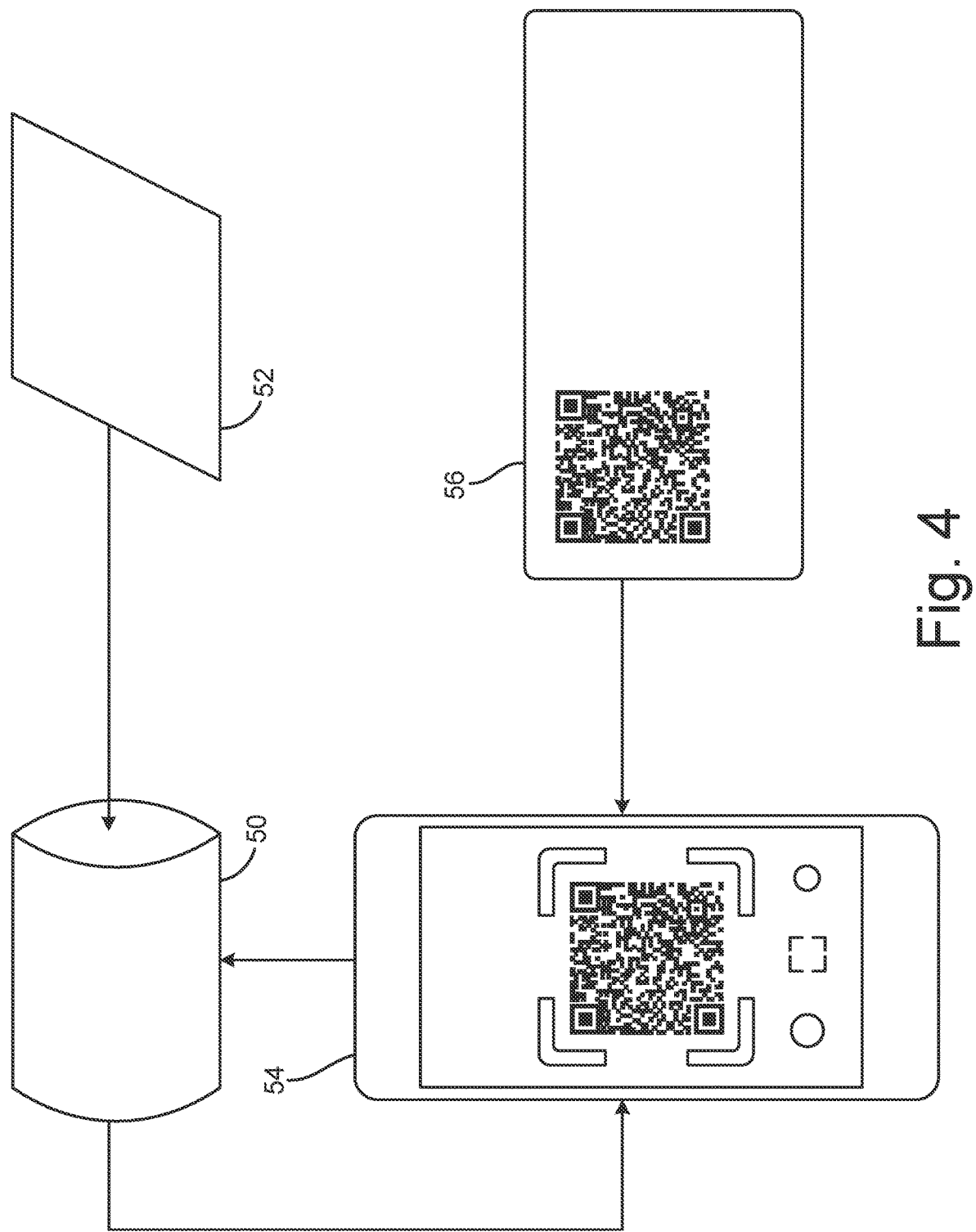
FIG. 4 is a flowchart of a method of communicating maintenance data.

FIG. 4 is a flowchart of communicating maintenance data and shows AMD 50, PHM data 52, optical scanner 54, and placard 56.

AMD 50 is an aircraft maintenance database. PHM data 52 is prognostic health management ("PHM") data. In this example, PHM data 52 includes a cycle count or a number of duty cycles of the aircraft, the aircraft engine, and/or of engine cooler 28. PHM data 52 can also include a number of service hours, aircraft identification, and an orientation/position of engine cooler 28. Optical scanner 54 is a device for optically scanning an item. In this example, optical scanner 54 includes a camera as part of a handheld unit such as a cellular telephone. In another example, optical scanner 54 can be a device configured to optically scan a RFID tag such as an RFID scanner or a smartphone (e.g., running an iOS or Android OS). In other examples, optical scanner 54 can be a device configured to read data via one or more forms of automatic identification and data capture. Placard 56 is a label or a signage plate. In this example, placard 56 includes a dot matrix label. In another example, placard 56 can include a label or an engravement.

In this example, AMD 50 is an electronic database disposed separately from the aircraft. In this example, PHM data 52 can be produced by and/or tracked by the aircraft. In this example, optical scanner 54 is connected via a wired or wireless connection to AMD 50. Placard 56 is mounted onto one of ECS packs 14A or 14B, first or second heat exchanger 20A or 20B, or engine cooler 28.

In this example, AMD 50 stores and tracks a maintenance schedule for the aircraft. PHM data 52 is used to track relevant data of the aircraft and is used by AMD 50 to determine and suggest appropriate maintenance events. Optical scanner 54 functions by optically scanning information stored on engine cooler 28 and communicating that information to AMD 50. For example, optical scanner 54 scans placard 56 in response to an action by the mechanic. Placard 56 contains and stores information to be scanned by optical scanner 54 and to visually indicate information to a mechanic.

In one example, a method of communicating maintenance data includes marking engine cooler 28. Here, engine cooler 28 can be marked with at least one of a placard, a dot matrix label, an RFID tag, and an engravement. The marking on engine cooler 28 is scanned with an optical sensor. Here, the marking can be stored on placard 56. A first orientation N of engine cooler 28 is detected based on the scanned part marking. The detected orientation of the engine cooler is reported to AMD 50. For example, a mechanic can enter the orientation of engine cooler 28 into AMD 50 as engine cooler 28 goes on to or comes off the aircraft to aid in determining the next position/orientation of engine cooler 28. A recommendation of installation position is provided by AMD 50 based on the detected orientation of engine cooler 28 and on PHM data 52 of the aircraft. In this example, the recommendation of installation is based on a tracked number of duty cycles, which is tracked by AMD 50. Engine cooler 28 is then installed into position onto the aircraft based on the recommended installation position from AMD 50.

In this example, providing the recommendation of installation position includes instructing a mechanic with AMD 50 to install engine cooler 28 in one of either the first orientation N or a second orientation N+1, which is rotated 180° from first orientation N. Here, the instruction is based on updated maintenance records and on information in AMD 50.

In another example, a method of tracking an engine cooler in an aircraft includes recording an orientation of engine cooler 28 as orientation N. Here, recording the orientation of engine cooler 28 can include recording the orientation of engine cooler 28 in AMD 50. PHM data 52 of the aircraft is tracked. In this example, PHM data 52 can include a cycle count, a number of duty cycles, and/or a number of operation hours of the aircraft. A maintenance check of the aircraft is performed based on the tracked PHM data 52. A determination is made with AMD 50 as to whether to rotate an orientation of engine cooler 28 based on the tracked PHM data 52 of the aircraft. A recommendation is provided by AMD 50 as to whether to rotate engine cooler 28. Engine cooler 28 is either rotated or not rotated based on the recommendation of AMD 50 as to whether to rotate engine cooler 28. Here, rotating engine cooler 28 can include rotating engine cooler 28 180° about a centerline axis (e.g., rotational axis 30) of engine cooler 28. The orientation of engine cooler 28 is then recorded as orientation N+1.

In one example, there can be a visible reference mark on engine cooler 28 that indicates to the mechanic which way to orient engine cooler 28 relative to its previous position. For example, a physical or inked demarcation can be placed adjacent to inlet 34. Then, looking towards the engine outlet, the demarcation might be to the right for orientation N. At the next rotation (i.e., orientation N+1), the demarcation would be on the left side (looking towards the engine outlet). Instructions could then be communicated via optical scanner 54 or by other instructions. In another example, a gyroscope sensor can be used to sense the orientation of engine cooler 28 and indicate to the mechanic which way to orient engine cooler 28 relative to its previous position. The gyroscope sensor can be a part of or separate from optical scanner 54. For example, the gyroscope sensor (e.g., of optical scanner 54) can be placed in alignment with a placard (e.g., a QR code placard) on engine cooler 28. With the gyroscope sensor in place on engine cooler 28, the orientation of engine cooler can be determined based on the sensed orientation of the gyroscope sensor. Instructions could then be communicated via optical scanner 54 or by other instructions whether the orientation of engine cooler 28 needed to be switched or to remain as-is.

Figure 5:
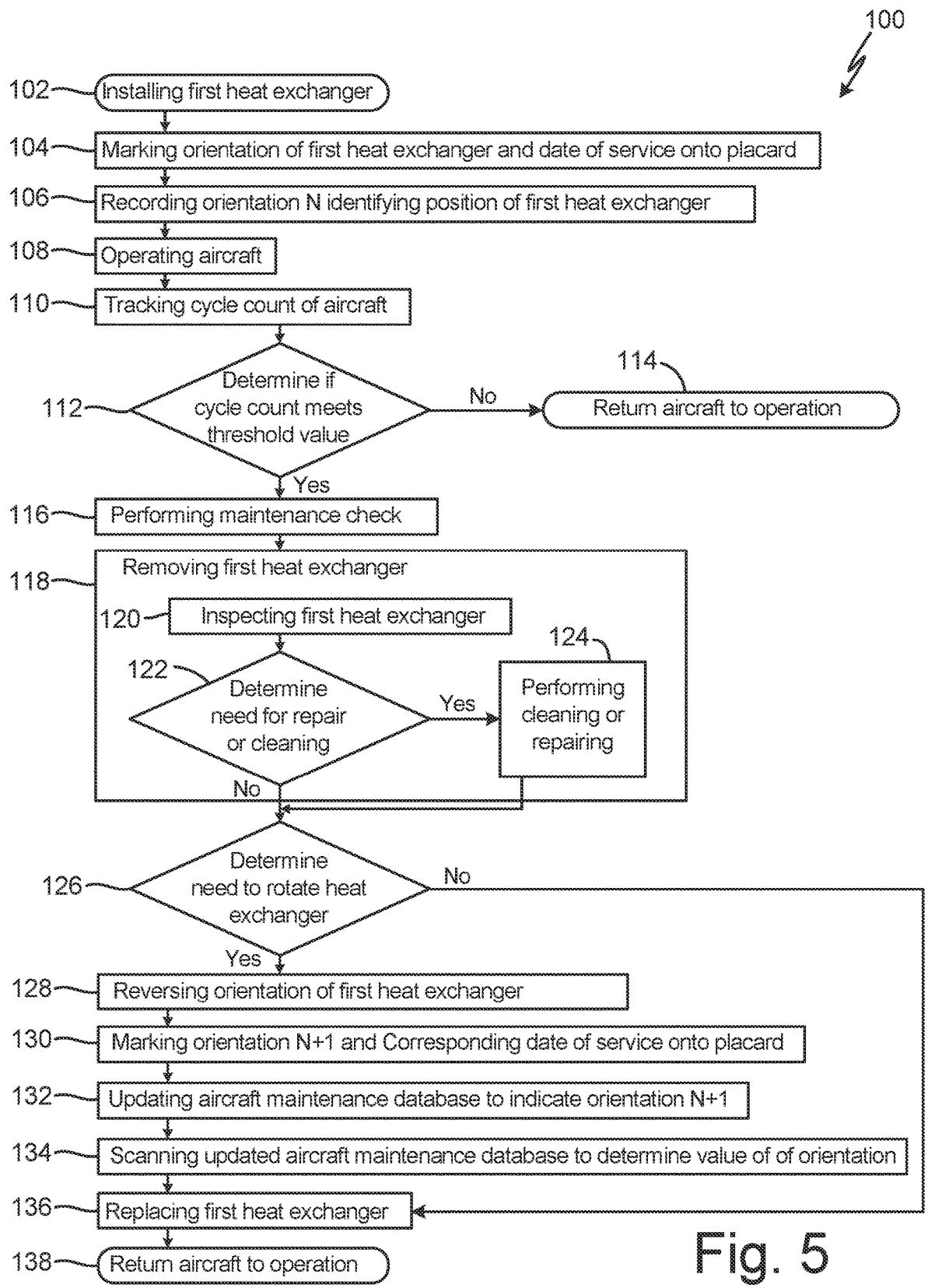
FIG. 5 is a flowchart of method of managing a maintenance schedule of the engine coolers.

FIG. 5 is a flowchart of method 100 of managing a maintenance schedule of engine cooler 28. Method 100 includes steps 102-138.

Step 102 includes installing engine cooler 28 on to an engine. Step 104 includes marking the orientation of engine cooler 28 and a date of service onto placard 56 of engine cooler 28. In another embodiment, step 104 can be replaced with scanning the placard and uploading the information to AMD 50. Step 104 could include scanning a data matrix on engine cooler 28. Then, the information from scanning the data matrix can be digitally reported to or entered directly into AMD 50. Step 106 includes recording an orientation N in AMD 50 that identifies a position of engine cooler 28. Step 108 includes operating the aircraft. Step 110 includes tracking a cycle count of the aircraft. In one example, a cycle count of the aircraft can be or be based on a number of service hours of the engine cooler, the engine, and/or of the aircraft.

Step 112 includes determining if the tracked cycle count meets a first threshold value. Here, the threshold value can be a predetermined amount of cycle counts or service hours of the engine cooler, the engine, and/or of the aircraft. If the tracked cycle count does not meet the first threshold value, then the aircraft is returned to operation as shown in step 114. If the tracked cycle count does meet the first threshold value, then the method proceeds to step 116. Step 116 includes performing a maintenance check of the aircraft. In one example, the maintenance check can be a regularly scheduled A-check, B-check, or a C-check of the aircraft. Step 118 includes removing engine cooler 28 from the aircraft. Step 118 also includes steps 120 through 124. Step 120 includes inspecting engine cooler 28 during the maintenance check. Step 122 includes determining a need for repairing or cleaning engine cooler 28 based on the inspection of engine cooler 28. For example, if engine cooler 28 shows signs of a crack, a deposit of dirt, or a sign of localized thermal fatigue, then engine cooler 28 can be cleaned and/or repaired as necessary to address these issues. If there is a need for repairing or cleaning engine cooler 28 based on the inspection, then the cleaning or repairing is completed as step 124. After step 124 is completed, then the method proceeds to step 126. If there is not a need for repairing or cleaning engine cooler 28 based on the inspection, then the method proceeds to step 126, bypassing step 124.

Step 126 includes determining whether engine cooler 28 needs to be rotated. Here, determining whether to rotate engine cooler 28 is based on whether engine cooler 28 has met a second threshold amount of cycle counts or service hours since engine cooler 28 was last rotated. In another example, determining whether to rotate engine cooler 28 can be based on whether engine cooler 28 shows signs of thermal fatigue. If engine cooler 28 meets the threshold value of cycle counts or service hours, then the method proceeds to step 128. Here, a number of cycle counts and service hours is stored and tracked in AMD 50. Additionally, the previous orientation of engine cooler 28 is stored in AMD 50, so that AMD 50 can instruct the user (e.g., mechanic) as to which position/orientation engine cooler 28 was removed from and which position/orientation engine cooler 28 should be replaced into. If engine cooler 28 does not meet the threshold value of cycle counts or service hours, then the method proceeds to step 136.

Step 128 includes reversing an orientation of engine cooler 28. In this example, reversing the orientation of engine cooler 28 can include rotating engine cooler 28 180° about a first centerline axis (e.g., rotational axis 30) of engine cooler 28. Step 130 includes marking orientation N+1 and a corresponding date of service onto placard 56 of engine cooler 28. In another embodiment, step 130 can be optional if the placard is scanned and the scanned information uploaded to AMD 50. In such an embodiment, AMD 50 could then advise what the next recommended position of engine cooler 28 should be using optical scanner 54 (e.g., smartphone). Step 132 includes updating AMD 50 to indicate the reversed orientation of engine cooler 28 as orientation N+1. Step 134 includes scanning the updated AMD 50 with optical scanner 54 to determine a value of the orientation. Step 136 includes replacing engine cooler 28 into the aircraft. Step 138 includes returning the aircraft to regular operation.

DISCUSSION OF POSSIBLE EMBODIMENTS

A method of tracking an engine cooler in an aircraft includes recording an orientation of the engine cooler as orientation N. Prognostic health management data of the aircraft is tracked. A maintenance check of the aircraft is performed based on the tracked prognostic health management data. Whether to rotate an orientation of the engine cooler is determined with an aircraft maintenance database based on the tracked prognostic health management data of the aircraft. A recommendation is provided by the aircraft maintenance database as to whether to rotate the engine cooler. The orientation of the engine cooler is recorded as orientation N+1.

The method of the preceding paragraph can optionally include, additionally and/or alternatively, any one or more of the following steps, features, configurations and/or additional components.

The orientation of the engine cooler can be recorded in the aircraft maintenance database.

The prognostic health management data can comprise a cycle count of the aircraft.

The engine cooler can be rotated by a user based on the recommendation of the aircraft maintenance database as to whether to rotate the engine cooler.

The engine cooler 180° can be rotated about a first centerline axis of the engine cooler.

A method of managing an orientation of an engine cooler includes marking the engine cooler. The marking on the engine cooler is scanned with a scanner. A first orientation N of the engine cooler is detected based on the scanned marking. The detected orientation of the engine cooler is reported to the aircraft maintenance database. Maintenance records, of the aircraft maintenance database, are updated with the reported detected orientation of the engine cooler. A recommendation of installation position is provided based on the detected orientation of the engine cooler and on prognostic health management data of the aircraft. The engine cooler is installed onto the aircraft based on the recommended installation position from the aircraft maintenance database.

The method of the preceding paragraph can optionally include, additionally and/or alternatively, any one or more of the following steps, features, configurations and/or additional components.

The recommendation of installation can be based on a tracked number of duty cycles, an amount of which is tracked by the aircraft maintenance database.

A user can be instructed with the aircraft maintenance database to install the engine cooler in one of either the first orientation N or a second orientation N+1, wherein the second N+1 orientation can be rotated 180° from first orientation N, wherein the instruction can be based on updated maintenance records and/or on information in the aircraft maintenance database.

The engine cooler can be marked with at least one of a placard, a dot matrix label, a radio-frequency identification tag, and an engravement.

The marking can be scanned with an optical sensor or a radio-frequency identification reader.

A method of managing maintenance of an environmental control system of an aircraft includes installing a first heat exchanger as part of the environmental control system. An orientation N identifying a position of the first heat exchanger is recorded in an aircraft maintenance database. A cycle count of the aircraft is tracked with a cycle counter. A maintenance check of the aircraft is performed when the tracked cycle count reaches a threshold value. The first heat exchanger is removed from the aircraft. Whether to rotate an orientation of the heat exchanger is determined based on the tracked cycle count of the aircraft. An orientation of the heat exchanger is reversed. The aircraft maintenance database is updated to indicate the reversed orientation of the first heat exchanger as orientation N+1. The first heat exchanger is replaced into the aircraft.

The method of the preceding paragraph can optionally include, additionally and/or alternatively, any one or more of the following steps, features, configurations and/or additional components.

The first heat exchanger can be inspected during the maintenance check, the need for cleaning or repairing the first exchanger can be identified based on the inspection of the first heat exchanger, and/or at least one of cleaning and repairing of the first heat exchanger can be performed.

The first engine cooler can be inspected for a crack, a deposit of dirt, or a sign of localized thermal fatigue.

The updated aircraft maintenance database can be scanned to determine a value of the orientation.

The orientation of the first heat exchanger and a date of service can be marked onto a placard of the first heat exchanger.

An orientation N+1 and/or a corresponding date of service can be marked onto a placard of the first heat exchanger.

While the invention has been described with reference to an exemplary embodiment(s), it will be understood by those skilled in the art that various changes may be made and equivalents may be substituted for elements thereof without departing from the scope of the invention. For example, the terms, elements, and/or components of "engine cooler" and "heat exchanger" can be used interchangeably amongst every embodiment disclosed herein and throughout the claims provided herewith. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of tracking an orientation of an engine cooler in an aircraft, the method comprising:
   recording, an aircraft maintenance database, the orientation of the engine cooler as orientation N;
   tracking prognostic health management data of the aircraft;
   performing a maintenance check of the aircraft based on the tracked prognostic health management data;
   determining, with the aircraft maintenance database, whether to rotate an orientation of the engine cooler based on the tracked prognostic health management data of the aircraft;
   providing, with the aircraft maintenance database, a recommendation as to whether to rotate the engine cooler; and
   recording the orientation of the engine cooler as orientation N+1.

2. The method of claim 1, wherein recording the orientation of the engine cooler comprises recording the orientation of the engine cooler in the aircraft maintenance database.

3. The method of claim 1, wherein the prognostic health management data comprises a cycle count of the aircraft.

4. The method of claim 1, further comprising rotating, by a user, the engine cooler based on the recommendation of the aircraft maintenance database as to whether to rotate the engine cooler.

5. The method of claim 4, wherein rotating the engine cooler comprises rotating the engine cooler 180° about a first centerline axis of the engine cooler.

6. A method of managing an orientation of an engine cooler, the method comprising:
   marking the engine cooler;
   scanning, with a scanner, the marking on the engine cooler;
   detecting a first orientation N of the engine cooler based on the scanned marking;
   reporting the detected orientation of the engine cooler to the aircraft maintenance database;
   updating maintenance records, of the aircraft maintenance database, with the reported detected orientation of the engine cooler;
   providing, with the aircraft maintenance database, a recommendation of installation position based on the detected orientation of the engine cooler and on prognostic health management data of the aircraft; and
   installing the engine cooler onto the aircraft based on the recommended installation position from the aircraft maintenance database.

7. The method of claim 6, wherein the recommendation of installation is based on a tracked number of duty cycles, an amount of which is tracked by the aircraft maintenance database.

8. The method of claim 6, wherein providing the recommendation of installation position comprises instructing a user, with the aircraft maintenance database, to install the engine cooler in one of either the first orientation N or a second orientation N+1, wherein the second N+1 orientation is rotated 180° from first orientation N, wherein the instruction is based on updated maintenance records and on information in the aircraft maintenance database.

9. The method of claim 6, wherein marking the engine cooler comprises marking the engine cooler with at least one of a placard, a dot matrix label, a radio-frequency identification tag, and an engravement.

10. The method of claim 6, wherein scanning the marking on the part comprises scanning the marking with an optical sensor or a radio-frequency identification reader.

11. A method of managing maintenance of an environmental control system of an aircraft, the method comprising the following steps, in order:
   a. installing a first heat exchanger as part of the environmental control system;
   b. recording, in an aircraft maintenance database, an orientation N identifying a position of the first heat exchanger;
   c. tracking, with a cycle counter, a cycle count of the aircraft;
   d. performing a maintenance check of the aircraft when the tracked cycle count reaches a threshold value;
   e. removing the first heat exchanger from the aircraft;
   f. determining, with an aircraft maintenance database, whether to rotate an orientation of the heat exchanger based on the tracked cycle count of the aircraft;
   g. reversing an orientation of the first heat exchanger, wherein reversing the orientation of the first heat exchanger includes rotating the first heat exchanger 180° about a first centerline axis;
   h. updating the aircraft maintenance database to indicate the reversed orientation of the first heat exchanger as orientation N+1; and
   i. replacing the first heat exchanger into the aircraft.

12. The method of claim 11, further comprising:
   inspecting, during the maintenance check, the first heat exchanger;
   identifying the need for cleaning or repairing the first exchanger based on the inspection of the first heat exchanger; and
   performing at least one of cleaning and repairing of the first heat exchanger.

13. The method of claim 12, wherein identifying the need for cleaning or repairing comprises inspecting the first engine cooler for a crack, a deposit of dirt, or a sign of localized thermal fatigue.

14. The method of claim 11, further comprising scanning the updated aircraft maintenance database to determine a value of the orientation.

15. The method of claim 11, further comprising marking the orientation of the first heat exchanger and a date of service onto a placard of the first heat exchanger.

16. The method of claim 11, further comprising marking orientation N+1 and a corresponding date of service onto a placard of the first heat exchanger.

* * * * *